United States Patent [19]
Brain

[11] 3,908,816
[45] Sept. 30, 1975

[54] CONVEYOR DEVICE
[75] Inventor: Douglas Harold Brain, Giffnock, Scotland
[73] Assignee: J. & P. Coats Limited, Glasgow, Scotland
[22] Filed: Feb. 28, 1974
[21] Appl. No.: 446,953

Related U.S. Application Data
[63] Continuation of Ser. No. 246,164, April 21, 1972, abandoned.

[30] Foreign Application Priority Data
Apr. 22, 1971 United Kingdom............... 10772/71
July 28, 1971 United Kingdom............... 35356/71

[52] U.S. Cl. .................. 198/41; 198/165; 198/191
[51] Int. Cl.² ........................................ B65G 17/46
[58] Field of Search ........ 198/41, 165, 191, 75, 102

[56] References Cited
UNITED STATES PATENTS

| | | | |
|---|---|---|---|
| 1,441,250 | 1/1923 | Smith | 198/41 X |
| 2,881,901 | 4/1959 | Zimmer | 198/41 |
| 3,067,718 | 12/1962 | Kraft | 198/41 X |
| 3,167,168 | 1/1965 | Park | 198/41 X |
| 3,179,241 | 4/1965 | Kain | 198/41 X |
| 3,610,695 | 10/1971 | Yabuta | 198/41 X |
| 3,616,978 | 11/1971 | Haslam | 198/41 X |
| 3,642,118 | 2/1972 | Kornylak | 198/41 |

*Primary Examiner*—Evon C. Blunk
*Assistant Examiner*—James L. Rowland
*Attorney, Agent, or Firm*—Larson, Taylor & Hinds

[57] ABSTRACT

A conveyor device of the moving belt type comprises two belts arranged with a flight of each parallel to and adjacent a flight of the other, at least one of the belts being a driving belt, one belt being of non-magnetic material and the other belt being of such a construction that it is attracted toward the source of a magnetic field, magnet pole pieces spaced longitudinally of and transversely apart along opposite edge portions of the adjacent flights of the belts and on the side of the flight of the non-magnetic belt remote from the other belt, and a slipper bar disposed longitudinally of the belts between the transversely spaced magnet poles adjacent the belt of non-magnetic material, the belt of non-magnetic material being slidably engageable with the slipper bar. The portion of the non-magnetic belt engaged with the slipper bar lies between the transversely spaced pole pieces, the width of the non-magnetic belt being less than the transverse distance between the pole pieces.

5 Claims, 5 Drawing Figures

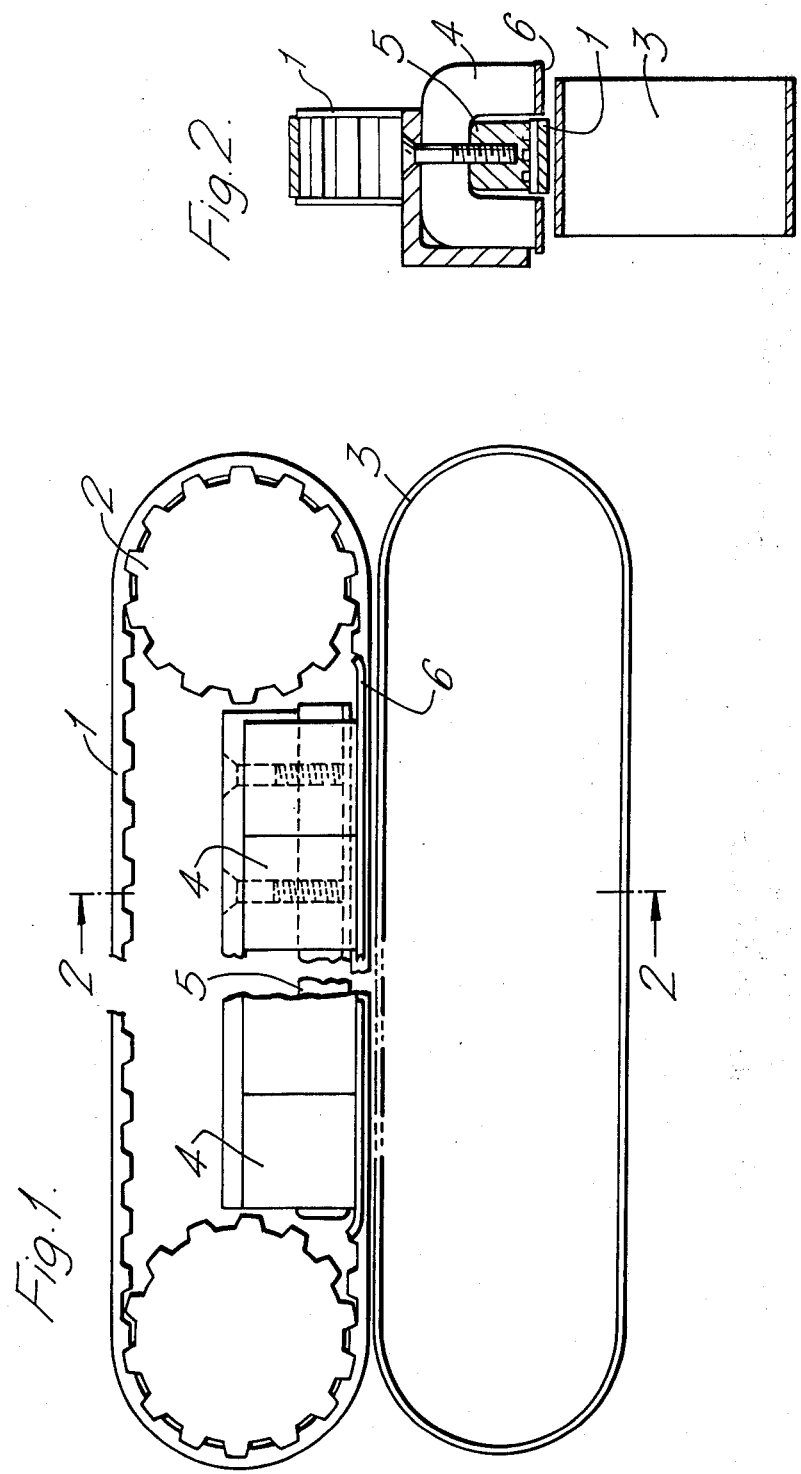

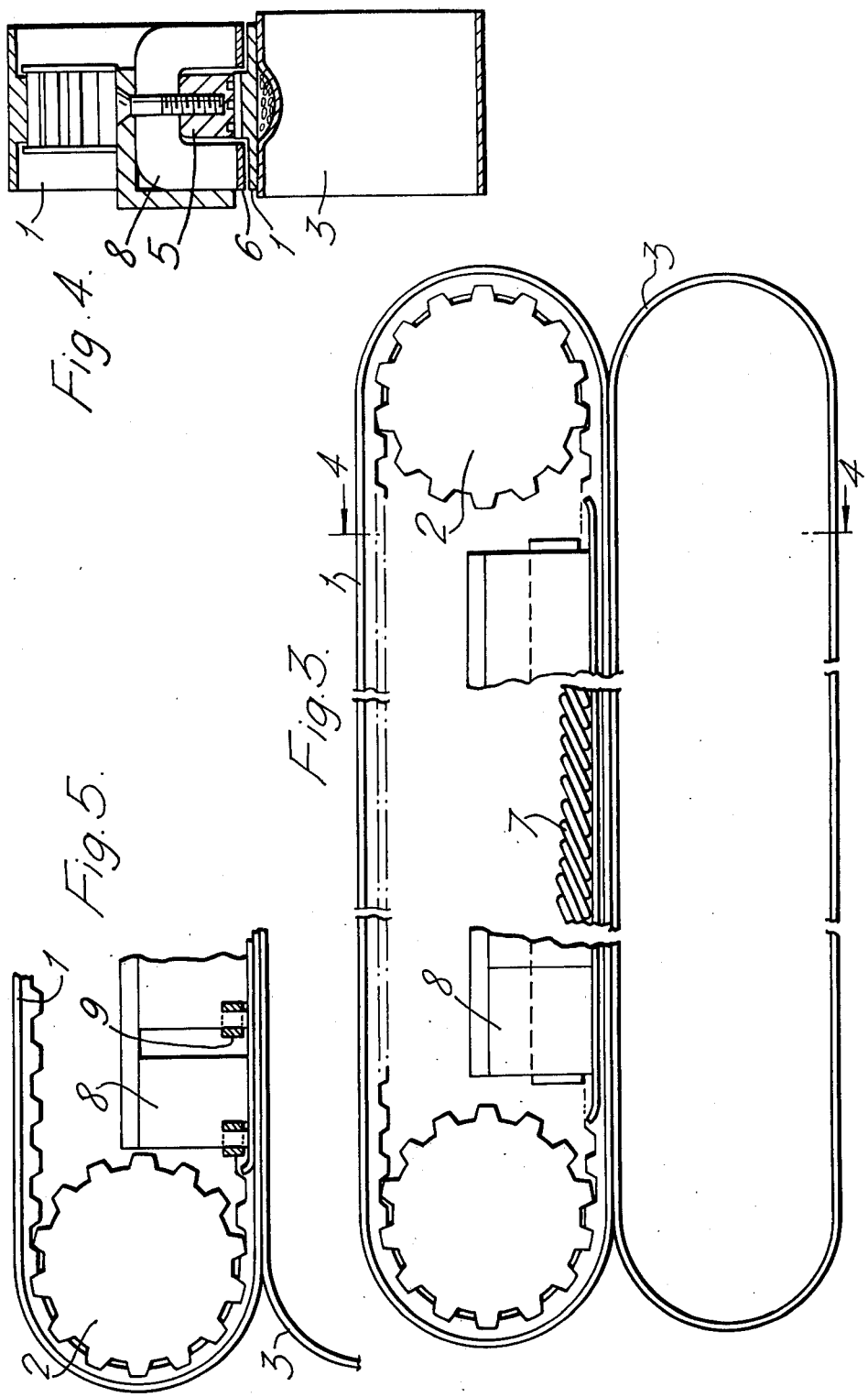

CONVEYOR DEVICE

This is a continuation, of application Ser. No. 264,164 filed Apr. 21, 1972, now abandoned.

The subject of this invention is a conveyor device.

A conveyor device as normally constructed incorporates a belt resting on supporting rollers at least one of which is connected to a driving means. In such a conveyor device the traction force on the material being conveyed is transmitted as a result of the frictional grip of the material resting on the belt. This is reasonably satisfactory where the material being conveyed is a dense material and where the angle of inclination of the conveyor from the horizontal is small. Where, however, the material to be conveyed is light, e.g., sheets of textile material or paper and/or the angle of inclination at which the material is to be elevated is great the normal type of conveyor device is unsuitable. Another disadvantage of the normal type of conveyor device lies in the slight sag of the belt between adjacent supporting rollers. Where heavy material is being carried power is wasted in the undulating movement of the material over the rollers. Where the material being conveyed is loose material the conveyor belt must be formed as a trough to prevent material from spilling over the edges of the belt and this means providing horizontal and inclined rollers at each support point. This all adds to expense, both in making the conveyor device and in maintenance, and friction in operation of the conveyor device.

It is obviously desirable to eliminate the stated drawbacks of existing conveyor devices. This is the object of the conveyor device of the present invention.

A conveyor device according to the invention incorporates two belts arranged with a flight of each parallel to and adjacent a flight of the other, at least one of the belts being a driving belt, one belt being of non-magnetic material and the other belt being of such a construction that it is attracted toward the source of a magnetic field, magnet pole pieces spaced longitudinally of the adjacent flights of the belts and transversely apart so as to lie adjacent and along the opposite marginal portions of the adjacent flights of the belts and on the side of the flight of the belt of non-magnetic material remote from the other belt, and a slipper bar disposed longitudinally of the belts between the transversely spaced magnet pole pieces adjacent the belt of non-magnetic material, a portion of the adjacent flight of the belt of non-magnetic material being slidably engageable with the slipper bar, the width of the non-magnetic belt being less than the transverse distance between the pole pieces such that the portion of the non-magnetic belt engaged with the slipper bar lies between the transversely spaced pole pieces, and the surface of the non-magnetic belt presented to the other belt occupying a position beyond the surface of the pole pieces presented to the other belt a distance less than the thickness of the non-magnetic belt.

The magnets may be of horseshoe type and may be arranged transversely of the belts. For some purposes all the north poles of the magnets may be on one side of the center line of the adjacent flights of the belts, all the south poles of the magnets being on the other side of the said center line. For other purposes it may be desirable to arrange that the poles on each side of the center line may be alternately north and south poles.

Where all the magnet pole pieces on each respective side of the center line of the belts are of like polarity they may be connected by respective pole shoes.

The magnets may be permanent magnets or electromagnets.

The belt constructed to be attracted to a magnetized object may be a flexible band of paramagnetic material in strip or gauze form or may be a flexible band of non-magnetic material carrying a flexible longitudinally disposed strip of paramagnetic material or two strips of such paramagnetic material arranged opposite the magnet pole pieces. Examples of paramagnetic materials are iron, nickel, copper and aluminum.

Alternatively the belt may be of textile material having woven into it weft and/or warp strands of paramagnetic material.

In a further alternative the belt may be of flexible material having attached thereto rigid plates of paramagnetic material.

The adjacent surface of the non-magnetic belt may also be formed with a slipper surface arranged to present the minimum of friction against the slipper bar.

The magnets where of horseshoe type may straddle the slipper bar and may be supported by it.

The adjacent flights of the belts may be horizontal or inclined or vertical, or they may have portions which are horizontal and/or inclined and/or vertical.

Where the adjacent flights of the belts are horizontal or inclined and the magnets are electromagnets and are arranged above the adjacent flights of the belts runners may be provided below the belt which is constructed to be attracted to the magnets to support the belt when the magnets are unenergized.

Where the magnets are electromagnets they may be constructed to be energized by direct current or alternating current.

One or both belts may be connected to an external driving means such as an electric motor.

It is already known to provide a conveyor of conventional form arranged to operate on the principle of a linear induction motor but such known conveyors suffer from the drawback that since the material being conveyed would be interposed between the magnets acting as the stator and the belt acting as the rotor if the drive were to take place on the flight containing the material the clearance gap between the rotor and the stator would be too big so that the driving mechanism must be located to operate on portions of the belt which are not carrying the material being conveyed. The driving force on the material being conveyed is thus transmitted as a tension in the belt and this can cause stretching of the belt. This is one drawback of a convential conveyor. It would thus be of considerable advantage if the driving force could be applied to the portion of the belt actually carrying the material to be conveyed and it is a further object of the present invention to provide a conveyor device as described operating on the principle of a linear induction motor in which this desirable condition is achieved.

A conveyor device as described arranged to operate on the principle of a linear motor has at least some of the magnets constructed as electromagnets arranged to provide a linearly moving field. In one construction the electromagnets are arranged for connection to a supply of polyphase alternating current, the electromagnets being arranged to be connected successively to successive phases of the current supply in a repeating series.

For example, where the current supply is three phase, the first, fourth, seventh . . . magnets are connected to the 1st phase, the second, fifth, eighth . . . magnets are connected to the second phase and the third, sixth, ninth . . . magnets are connected to the third phase.

Alternatively, a conveyor device as described arranged to operate as a linear motor incorporates magnets at least some of which are electromagnets arranged for connection to a supply of single phase alternating current, at least selected pole pieces of the magnets being formed as shaded poles fitted with split phase coils, i.e., short-circuited windings spanning part of the pole faces. Alternatively, alternative magnet coils may be constructed to have different resistances and/or inductances. In the latter construction the effect may be heightened by the incorporation of capacitors to simulate two phase operation.

The described single phase construction is particularly suitable for conveyors of light construction and small load-carrying capacity.

Where the conveyor is arranged to operate as a linear motor the magnets may be arranged in two groups, the magnets of one group providing a static attraction only on the belt arranged to be magnetically influenced, and the magnets of the other group providing a static attraction and a linearly moving field. In this construction the magnets providing the static attraction only may be permanent magnets or electromagnets.

In the constructions described for use with alternating current the magnetic material in the belt constructed to be magnetically influenced may be traversed by spaced conducting bars disposed transversely of the belt and interconnected at the ends by flexible or articulated connections.

To provide a sufficient cross sectional area of continuous magnetic circuit while retaining flexibility of the magnetically influenced belt said belt may be composed of or may carry flexible laminations of magnetic material. The laminations may be discontinuous and overlapping.

Practical embodiments of the invention are illustrated in the accompanying semi-diagrammatic drawings in which:

FIG. 1 illustrates a conveyor device incorporating permanent horseshoe magnets,

FIG. 2 is a section through the line 2—2 of FIG. 1,

FIG. 3 illustrates a conveyor arranged to operate on the principle of a linear induction motor, FIG. 4 is a section through the line 4—4 of FIG. 3, and FIG. 5 shows how the magnets may be arranged to permit a conveyor device to operate on the principle of a linear induction motor using single phase alternating current.

In the drawings 1 denotes a belt of non-magnetic material circulating around pulleys 2 one of which is a driving pulley. 3 denotes a belt of material constructed to be magnetically attracted to a magnetized object arranged to circulate so that one flight is parallel and close to a flight of the belt 1. 4 denotes permanent magnets of horseshoe form straddling and supported by a carrier bar 5 along the lower surface of which the lower flight of the belt 1 is arranged to slide as the belt 1 circulates. The pole faces of the permanent magnets 4 are connected to respective bars 6 of magnetizable material constituting magnetic pole pieces. The surfaces of the pole pieces 6 presented to the belt 3 are located slightly behind the surface of the belt 1 presented to the belt 3. In the construction of FIG. 3, 7 denotes electromagnets wound to present a number of consecutive poles arranged for connection to a supply of polyphase alternating current so that they provide when energized not only a static attraction on the belt 3 but also a linearly moving field, the electromagnets 7 being disposed as a group longitudinally between magnets 8 of another group which may be permanent magnets or electromagnets wound to provide only a static attraction on the belt 3. FIG. 4 illustrates how material being conveyed is maintained within the central portion of the belt 3 while the edge portions of the said belt 3 are attracted to the magnets 7 and 8 and are also held spaced a predetermined distance from the magnets 7 and 8 by the belt 1 of non-magnetic material which also serves to clamp the material being conveyed to the belt 3 and prevent it from spilling over from the belt 3. Referring to FIG. 5, 9 denotes split phase coils fitted to several pole faces of electromagnets arranged to be connected to a supply of single phase alternating current. The split phase coils 9 may be formed as tubes through which cooling liquid may be circulated.

It will be appreciated that the electromagnets 7 may be wired in conjunction with appropriate resistance and inductance components so that a single phase alternating current connected to the electromagnets provides the effect of a two phase moving field. This is another method of splitting the phase whereby to provide a moving field from a single phase supply. Under certain conditions it may be possible by cutting out the resistance and the inductance and rearranging the connections to the electromagnets to revert to simple single phase working once the conveyor belts have started moving.

In practice, the magnetic force of the magnets 4 or 7 and 8 causes the belt 3 to be attracted towards the magnets thus causing the belt 3 to move towards the non-magnetic belt 1. Any material located between the belts 1 and 3 is consequently gripped by the belts so that such material is positively fed as the driving belt circulates, taking with it the other belt. In the construction of FIGS. 1 and 2, the non-magnetic belt 1 is the driving belt and in the construction of FIGS. 3 and 4 the belt 3 is the driving belt. Because of the gripping action of the belts on the material being conveyed, and particularly in the constructions illustrated in FIGS. 3 and 4 where the edge portions of the belts are pressed towards one another by the magnetic action loose and powdery material and material dangerous to health can be conveyed through the open air without the use of specifically shaped belts and without spilling over the sides of the lowermost belt. Because of the clamping action of the belts the conveyor device can be disposed at a steep inclination and even vertically so that any material being conveyed including loose material can be raised at steep inclinations and even vertically.

Where the magnets are above the adjacent flights of the belts 1 and 3 the lowermost belt, which carries the material being conveyed, is supported entirely by the attraction of the magnets 4 or 7 and 8. The thrust of the magnets is taken by the slipper bar 5 against which the non-magnetic belt 1 is pressed. The magnets can be so arranged, particularly where they are electromagnets, to provide the minimum force capable of supporting the load so that frictional forces are reduced to a minimum. Since the slipper bar 5 is a continuous bar the material is carried in a non-undulating path so that no power is wasted in imparting undulating motion to material such as happens when passing material over the customary spaced supporting rollers in conventional conveyors. The elimination of the supporting rollers with their attendant bearings reduces the cost of the device as well as avoiding frictional losses and maintenance expenses.

Where the invention consists in a device as described arranged to operate on the principle of a linear induction motor there is no need to supply a driving means for the conveyor device because the magnets arranged to provide a linearly moving field, in addition to providing the support for the belt carrying the material to be conveyed, also supply the traction. As the traction is applied to the portion of the belt actually carrying the material being conveyed there is no longitudinal stretching action on the belt. Also, the gap between the edge portions of the belt magnetically attracted to the magnets can be kept small because the material being conveyed does not enter this gap so that the electrical losses normally high because of the presence of the gap are kept to a minimum. In this connection in the construction of FIGS. 1 and 2 the relative positions of the magnets 4 and the non-magnetic belt 1 can be so arranged that the surface of the non-magnetic belt 1 presented to the other belt 3 lies only slightly beyond the surfaces of the pole pieces 6 presented to the belt 3 so that the operating gap between the pole pieces 6 and the belt 3 can be the practical minimum and certainly much less than the thickness of the non-magnetic belt 1.

I claim:

1. A conveyor device of the moving belt type incorporating two belts arranged with a flight of each parallel to and adjacent a flight of the other, at least one of the belts being a driving belt, one belt being of non-magnetic material and the other belt being of such a construction that it is attracted toward the source of a magnetic field, magnet pole pieces spaced longitudinally of the adjacent flights of the belts and transversely apart so as to lie adjacent and along the opposite marginal portions of the adjacent flights of the belts and on the side of the flight of the belt of non-magnetic material remote from the other belt, and a slipper bar disposed longitudinally of the belts between the transversely spaced magnetic poles adjacent the belt of non-magnetic material, a portion of the adjacent flight of the belt of non-magnetic material being slidingly engageable with the slipper bar, the width of the non-magnetic belt being less than the transverse distance between said pole pieces such that the portion of the non-magnetic belt engaged with the slipper bar lies between the transversely spaced pole pieces, the surface of the non-magnetic belt presented to the other belt occupying a position beyond the surface of the pole pieces presented to the said other belt a distance less than the thickness of the non-magnetic belt.

2. A conveyor device as claimed in claim 1 in which the magnets are of horseshoe type arranged transversely of the belts.

3. A conveyor device as claimed in claim 2 in which all the magnet pole pieces on each respective side of the center line of the belts are of like polarity and respective pole shoes connect all the magnet pole pieces of like polarity.

4. A conveyor device as claimed in claim 1 in which the magnets are of horseshoe type and straddle the slipper bar and are supported by it.

5. A conveyor device as claimed in claim 1 in which at least some of the magnets are electromagnets.

* * * * *